W. W. FULLER.
CAR WHEEL.
APPLICATION FILED FEB. 24, 1919.

1,319,275.

Patented Oct. 21, 1919.

W. W. Fuller
Inventor

By Norman T. Whitaker
his Attorney

UNITED STATES PATENT OFFICE.

WILLIAM W. FULLER, OF CHARLESTON, SOUTH CAROLINA.

CAR-WHEEL.

1,319,275.      Specification of Letters Patent.      Patented Oct. 21, 1919.

Original application filed January 16, 1918, Serial No. 212,109. Divided and this application filed February 24, 1919. Serial No. 278,845.

*To all whom it may concern:*

Be it known that I, WILLIAM W. FULLER, a citizen of the United States, and a resident of Charleston, in the county of Charleston and State of South Carolina, have invented new and useful Improvements in Car-Wheels, of which the following is a specification.

This invention relates to car wheels and has particular reference to that class of car wheels employing a supplemental rim or tread.

An important object of the invention is to provide in a device of the above mentioned character a means whereby the supplemental rim may be easily placed upon the wheel and securely locked in position thereupon.

A further object of the invention is to provide in a device of the above mentioned character a means whereby the rim may be readily unlocked and quickly removed or detached from the wheel.

A further object of the invention is to provide in a device of the above mentioned character a locking mechanism for the supplemental rim or tread which under varying conditions may be maintained at all times in a locked position.

A further object of the invention is to provide a device of the above mentioned character which is simple in construction, cheap to manufacture, strong, endurable, and reliable in operation.

Other objects and advantages of the invention will be apparent from the following description.

This application is a division of my application for car wheels filed January 16th, 1918, Serial No. 212,109, allowed February 28, 1918, which has eventuated into Patent No. 1,269,417, issued June 11, 1918.

Figure 1:
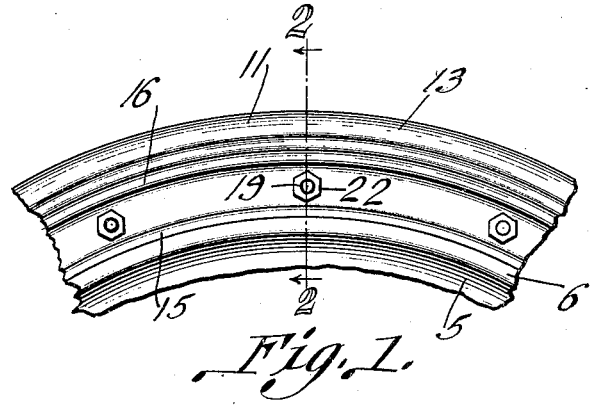
Figure 2:
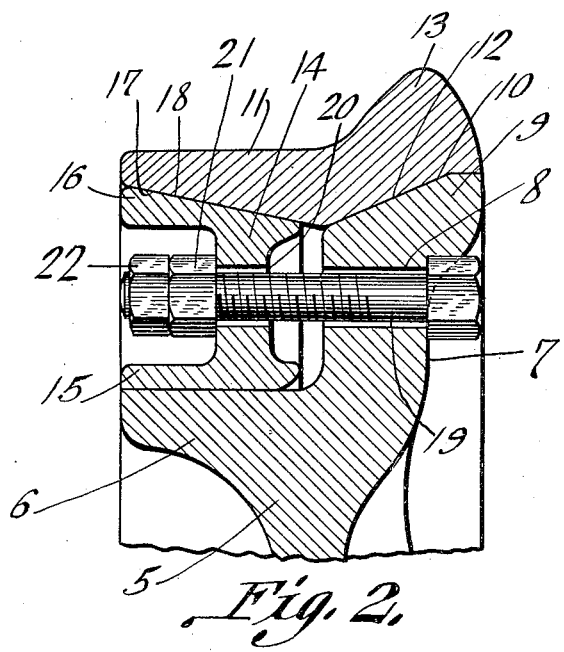

In the drawings forming a part of this specification and in which like numerals are employed to designate like parts throughout the same, Figure 1 is a fragmental view showing in elevation a portion of the device embodying my invention, and Fig. 2 is a cross sectional view of Fig. 1 taken on the line 2—2.

In the drawings wherein for the purpose of illustration is shown a preferred form of my invention the numeral 5 indicates the main body of a car wheel provided relatively near its periphery with a flange of 6 disposed at substantially a right-angle to the main body of the car wheel 5 as shown. The main body 5 of the car wheel is provided also with an upstanding flange 7 having a plurality of transversely disposed openings 8 provided therein. This upstanding flange 7 is slightly enlarged as shown at 9, relatively near its peripheral edge and is provided with an inclined face 10. In actual practice I have found in order to obtain the best results from the device as a whole that the face 10 should be disposed at an angle of approximately twenty degrees to a horizontal plane passed transversely through the flange 7.

Upon the inclined face 10 there is disposed a supplemental rim 11 provided relatively near one edge thereof with an inclined face 12 adapted to engage the inclined face 10 as shown. This supplemental rim or tread carries an enlarged portion 13 forming a flange similar to that employed in the conventional form of car wheel structure. An annular ring 14 is carried between the flange 6 and the supplemental rim or tread 11 and is provided at one edge thereof with a flange 15 adapted to engage the flange 6 as shown, while the other edge is provided with a flange 16 having a beveled face 17 adapted to engage an inner beveled face 18 carried by the supplemental rim 11 as shown.

In actual practice I have found in order to obtain the best results from the device as a whole that the face 17 should be disposed at an angle of approximately fifteen degrees to a horizontal plane passed transversely through the flange 7. A bolt 19 is passed through the opening 8 provided by the upstanding flange 7 and an opening 20 provided by the annual ring 14 and is held in position as shown by means of a nut 21 carried thereby and engaging the outer face of the annular ring 14. As the means for locking the nut 21 in position with respect to the bolt 19 there is provided a second nut 22 carried by the bolt 19 and adapted to engage the nut 21 as shown.

It will be noted when considering Fig. 2 that the faces 12 and 18 bear the same angular relation with respect to each other as the faces 10 and 17 bear to each other and that the angular faces 12 and 18 converge from a common point which lies in a vertical longitudinal plane passed through the supplemental rim substantially intermediate its parallel sides.

In assembling the preferred form of my invention the supplemental rim 11 is placed upon the upstanding flange 7 in the position shown. The annular ring 14 is then placed in the position clearly shown in Fig. 2, whereupon the bolt 19 is inserted into the openings 8 and 20, which bolt together with the nuts 21 and 22 serve as a means for retaining the annular ring 14 in the position shown. It is to be understood that as the nut 21 is run down upon the screw threaded bolt 19 and the annular ring 14 is carried in the direction of travel of the same the inclined face 17 of the annular ring 14 co-acts with the inclined face 18 of the tread 11 thereby gradually tightening the rim or tread 11 in the position desired. It will be further understood that the ring 14 serves not only as a means for retaining the supplemental rim or tread 11 in position but as a means whereby any wear or loosening between the supplemental rim or tread 11 and the annular ring 14 may be compensated.

From the foregoing description, taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, what I claim as new and desire to secure and protect by Letters Patent of the United States, is:

1. A device of the character described comprising a car wheel provided with a flange disposed substantially at right-angles thereto, an upstanding flange secured to the main body and provided with an enlarged head carrying an inclined face, the inclined face being disposed at an angle of substantially twenty degrees to a horizontal plane passed transversely through the second named flange, a supplemental rim provided with an inclined face disposed upon the second named flange, the inclined face of the supplemental rim being adapted to engage the inclined face of the upstanding flange and an annular ring disposed between the first mentioned flange and the supplemental rim, said rim being adapted to be held in engagement with the first mentioned flange and the supplemental rim to lock the rim upon the second named flange.

2. A device of the character described comprising a car wheel provided with a flange disposed substantially at right-angles thereto, an upstanding flange secured to the main body and provided with an enlarged head carrying an inclined face, the inclined face being disposed at an angle of substantially twenty degrees to a horizontal plane passed transversely through the second named flange, a supplemental rim provided with an inclined face disposed upon the upstanding flange, the inclined face of the supplemental rim being adapted to engage the inclined face of the upstanding rim, an annular ring provided with an inclined face disposed between the supplemental rim and the first mentioned flange, and a bolt passed through the upstanding flange and the annular ring, said bolt being adapted to retain the annular ring in the engagement with the supplemental rim and the first mentioned flange.

3. A device of the character described comprising of a main body provided with a flange disposed substantially at a right-angle thereto, a second flange carried by the main body and provided with an enlarged head having an inclined face, the inclined face being disposed at an angle of substantially twenty degrees to a horizontal plane passed transversely through the second named flange, an annular ring disposed upon the first mentioned flange and provided with an inclined face, the second named inclined face being disposed substantially at fifteen degrees to a horizontal plane passed transversely through the second named flange, a supplemental rim disposed upon the second mentioned flange and provided with inclined faces one of which is adapted to engage the inclined face carried by the second mentioned flange the other of which is adapted to engage the inclined face carried by the annular ring, the inclined face of the supplemental rim bearing an angular relation with respect to each other and diverging from a common point lying in a vertical plane passed through the supplemental rim substantially intermediate its longitudinal sides, and a bolt passed through the second named flange and the annular ring, said bolt being adapted to retain the annular ring in engagement with the first mentioned flange and supplemental rim.

WILLIAM W. FULLER.